United States Patent [19]

Hunter et al.

[11] Patent Number: 5,116,407

[45] Date of Patent: May 26, 1992

[54] ANTIFOULING COATINGS

[75] Inventors: Julian E. Hunter, Newcastle-upon-Tyne; James Reid, Tyne and Wear, both of Great Britain; David E. J. Arnold; George Hails, both of Newcastle-upon-Tyne, United Kingdom; Kenneth F. Baxter, Sunderland, United Kingdom; Andrian F. Andrews; Michael J. Nunn, both of Hexham, United Kingdom

[73] Assignee: Courtaulds Coatings Limited, United Kingdom

[21] Appl. No.: 418,852

[22] Filed: Oct. 10, 1989

[30] Foreign Application Priority Data

May 12, 1989 [GB] United Kingdom ............. 8910970
Oct. 13, 1989 [GB] United Kingdom ............. 8824003

[51] Int. Cl.$^5$ .................................................. C09D 4/00
[52] U.S. Cl. ................................ 106/16; 427/385.5; 106/15.05; 428/907
[58] Field of Search ............. 427/385.5, 382.2, 384; 106/16, 15.05; 523/122; 524/556, 560, 561, 562; 525/329.9; 428/907

[56] References Cited

U.S. PATENT DOCUMENTS

| | | | |
|---|---|---|---|
| 2,490,924 | 12/1949 | Schertz | 167/30 |
| 2,490,925 | 12/1949 | Schertz | 167/30 |
| 2,492,939 | 12/1949 | Schertz | 260/100 |
| 2,513,429 | 7/1950 | Rosher | 117/138.5 |
| 2,772,260 | 11/1956 | Yeager | 260/102 |
| 2,772,261 | 11/1956 | Yeager | 260/102 |
| 2,772,262 | 11/1956 | Yeager | 260/102 |
| 2,772,263 | 11/1956 | Yeager | 260/102 |
| 2,772,264 | 11/1956 | Yeager | 260/102 |
| 3,691,123 | 9/1972 | Clarke et al. | 260/290.1 R |
| 3,968,298 | 7/1976 | Reinert et al. | 427/421 |
| 4,130,524 | 12/1978 | Boerwinkle et al. | 427/156 |
| 4,172,177 | 10/1979 | Sato | 106/15.05 |
| 4,400,216 | 8/1983 | Arora | 106/23 |
| 4,474,916 | 10/1984 | Streit et al. | 524/556 |
| 4,485,131 | 11/1984 | Adams et al. | 524/556 |
| 4,522,972 | 6/1985 | Mondt et al. | 524/556 |
| 4,561,981 | 12/1985 | Characklis | 424/496 |
| 4,598,020 | 7/1986 | Panush | 427/407.2 |
| 4,675,051 | 6/1987 | Baxter | 106/16 |
| 4,675,374 | 6/1987 | Nichols | 525/430 |
| 4,687,789 | 8/1987 | Gonnet et al. | 524/560 |
| 4,818,797 | 4/1989 | Tsuda | 525/329.9 |
| 4,898,895 | 2/1990 | Masuoka et al. | 106/16 |
| 4,904,742 | 2/1990 | Perichaud et al. | 525/379 |

FOREIGN PATENT DOCUMENTS

| | | |
|---|---|---|
| 0040498 | 11/1981 | European Pat. Off. |
| 0069559 | 5/1985 | European Pat. Off. |
| 0232006 | 8/1987 | European Pat. Off. |
| 51-080849 | 7/1976 | Japan . |
| 54-110322 | 2/1978 | Japan . |
| 54-64633 | 5/1979 | Japan . |
| 63-57676 | 3/1988 | Japan . |
| 01103672 | 7/1988 | Japan . |
| 7403333 | 12/1974 | Netherlands ............ 106/16 |
| WO86026 | 5/1986 | PCT Int'l Appl. . |
| 1457590 | 12/1976 | United Kingdom . |
| WO8402915 | 5/1984 | World Int. Prop. O. . |

Primary Examiner—Michael Lusignan
Assistant Examiner—Diana L. Dudash
Attorney, Agent, or Firm—Eckert Seamans Cherin & Mellott

[57] ABSTRACT

Fouling of a ship's hull is inhibited by an amine of the formula

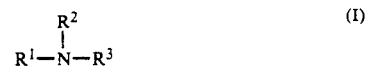

where $R^1$ is a monovalent hydrocarbon group derived from a diterpene and $R^2$ and $R^3$ are each independently hydrogen, an alkyl group having 1 to 18 carbon atoms or an aryl group having 6 to 12 carbon atoms. The amine acts as a paint binder and as a marine biocide. An antifouling coating composition may comprise a pigment with the said amine as binder. Alternatively an antifouling coating composition comprises as binder an acid-functional polymer whose acid groups are blocked by a monoamine group which forms an organic-solvent-soluble salt of the polymer.

8 Claims, No Drawings

ANTIFOULING COATINGS

FIELD OF THE INVENTION

This invention relates to antifouling coatings. An antifouling coating is used as a top coat on ships' hulls to inhibit the settlement and growth of marine organisms such as barnacles and algae, generally by release of a biocide for the marine organisms.

PRIOR ART

Traditionally, antifouling coatings have comprised a relatively inert binder with a biocidal pigment which is leached from the paint. Among the binders which have been used are vinyl resins, particularly a vinyl chloride/vinyl acetate copolymer, and rosin. The vinyl resins are seawater-insoluble and paints based on them use a high pigment concentration so that there is contact between pigment particles to ensure leaching. Rosin is a hard brittle resin which is very slightly soluble in seawater. The biocidal pigment is very gradually leached out of the matrix of rosin binder in use, leaving a skeletal matrix of rosin which becomes washed off the hull surface to allow leaching of the biocidal pigment from deep within the paint film.

The most successful antifouling paints in recent years have been "self-polishing copolymer" paints based on a polymeric binder to which biocidal triorganotin moieties are chemically bound and from which the biocidal moieties are gradually hydrolysed by seawater, as described for example in British Patent 1457590. The polymer from which the triorganotin moieties have been hydrolysed becomes soluble in seawater, so that as the outermost paint layer becomes depleted of biocide it is swept off the surface of the hull by the movement of the ship through seawater. Self-polishing copolymer paints which release non-biocidal moieties are described in European Patent 69559 and European Patent Application 232006.

International Patent Application WO84/02915 describes an anti-fouling paint having a hydrolysable film-forming water-insoluble seawater-erodible polymeric binder having recurring groups represented by the formula:

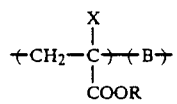

where X is hydrogen or methyl, R is an alkyl, aryl, aralkyl or triorganosilyl moiety and B is the residue of an ethylenically unsaturated comonomer. It has been found in practice that the less readily hydrolysable groups R such as benzyl, aminoalkyl or haloalkyl groups do not give a polymer which dissolves in seawater, whereas the more readily hydrolysable groups such as trialkylsilyl groups give a polymer which rapidly hydrolyses to a mechanically weak film in seawater.

Japanese Published Unexamined Patent Application 54-64633 describes a marine antifouling biocide which is a long-chain (12 to 18 carbon atoms) linear aliphatic primary amine or salt thereof. Japanese Published Unexamined Patent Application 54-110322 describes certain long-chain (12 to 18 carbon atoms) linear aliphatic secondary and tertiary amines as marine antifouling agents.

U.S. Pat. No. 4,675,051 describes a marine antifouling paint which is gradually dissolved in seawater and which comprises a binder which is a resin produced by the reaction of rosin and an aliphatic polyamine containing at least one primary or secondary amine group.

SUMMARY OF THE INVENTION

An antifouling coating composition according to the present invention comprises a binder and a pigment and is characterised in that the binder consists at least partly of an amine of the formula

where $R^1$ is a monovalent hydrocarbon group derived from a diterpene and $R^2$ and $R^3$ are each independently hydrogen, an alkyl group having 1 to 18 carbon atoms or an aryl group having 6 to 12 carbon atoms.

A process according to the invention for inhibiting fouling of a ship's hull, comprises applying to the hull an amine of the formula

where $R^1$, $R^2$ and $R^3$ are defined as above.

DETAILED DISCLOSURE

An amine of formula (I) acts both as a binder and as a marine antifouling biocide. The amine is preferably derived from rosin. The main constituent of rosin is abietic acid, which is mixed with other diterpene acids. The amine is preferably a primary or secondary amine. Secondary amines, for example those in which $R^2$ is a methyl group, may be the more effective biocides against fouling by animals such as barnacles, whereas primary amines may be the more effective biocides against algae. A primary amine derived from rosin is dehydroabietylamine sold commercially as "Rosin Amine D". Its main constituent is

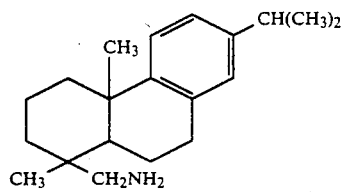

A corresponding secondary or tertiary amine, for example an N-methyl or N,N-dimethyl derivative of Rosin Amine D, can alternatively be used.

The amines of formula (I) are much more effective marine biocides than the amidoamines disclosed in U.S. Pat. No. 4,675,051. The amines of formula (I) can be used alone as a clear antifouling varnish to be applied to the ships' hulls and other marine surfaces. The amines can also be used as a paint binder with pigments, which may or may not have antifouling activity. The amines described in the above-mentioned Japanese Patent Applications 54-64633 and 54-110322 are not suitable for use as binders for antifouling paints or as antifouling varnishes to be used without an added binder because they do not dry to a tack-free film when applied as a coating.

In one preferred type of antifouling coating composition according to the invention the binder is a mixture of an amine of formula (I) with another resin, preferably a film-forming resin which is slightly soluble or swellable in seawater. Such a binder can for example contain 10 to 90%, preferably 35 to 80%, by weight of the amine and 90 to 10%, preferably 65 to 20%, by weight of the other resin. Examples of such film-forming binder resins which can be used with the amines are rosin or maleinised or fumarised rosin. The mixed binders are erodible in use in seawater in the manner of known soluble matrix antifouling paints. The mixed binders can be used as a clear antifouling varnish or with pigments, preferably a biocidal pigment such as cuprous oxide, to form an antifouling paint. The amine can alternatively be mixed with a water-insoluble film-forming resin, for example a vinyl ether resin such as a vinyl acetate/vinyl isobutyl ether copolymer, for example that sold under the Trade Mark "Laroflex". The amine can also be used in conjunction with a less water-sensitive resin such as a vinyl chloride polymer, particularly a vinyl chloride/vinyl acetate copolymer, or a polyamide, particularly a polyamide formed from a dimer fatty acid such as those sold under the Trade Mark "Versamid". In this case it may be preferred to use a high pigment volume concentration of a pigment which is slightly soluble in or reactive with seawater such as cuprous oxide and/or zinc oxide. The amine can also be used with a non-toxic self-polishing binder polymer as described in U.S. Pat. No. 4,593,055 or European Patent Application 232006, or with an organotin self-polishing copolymer as described in British Patent 1457590.

The amine of formula (I) can also be used as a mixture with one or more other high molecular weight amines in forming a binder for an antifouling paint according to the invention. It can for example be used with a long-chain (12 to 20 carbon atoms) aliphatic amine such as dodecyl amine, hexadecyl amine, octadecyl amine or oleyl amine, or a mixture of such amines, for example those sold as tallow amine, hydrogenated tallow amine, coconut amine, or N-methyl coconut amine. Although such long-chain amines are not suitable as paint binders or as varnishes when used alone, they may be useful in plasticising diterpene amines such as Rosin Amine D. Such a mixture of amines preferably contains at least 50% by weight of the amine of formula (I), for example 60 to 90%. Correspondingly, the long-chain aliphatic amine or the like is preferably present in an amount of from 5 to 50% by weight based on the weight of binder (including amine). One preferred form of antifouling paint binder or antifouling varnish according to the invention comprises a mixture of an amine of formula (I) with rosin and a long chain aliphatic amine, for example a mixture of 10–90% Rosin Amine D, 5–65% rosin and 5–50% of the aliphatic amine, by weight.

The antifouling paint binder or varnish can alternatively contain a mixture of the amine of formula (I) with a high molecular weight, preferably polymeric polyamine. Such polyamines are available commercially as curing agents, particularly for epoxy resins. The "Versamid" polyamides derived from dimer fatty acids are often amino-functional. The polyamides sold under the Trade Mark "Casamid" are alternative amino-functional polyamides which are used as curing agents and are water-dispersible. These polyamines sold as curing agents are generally too sticky to be used alone as paint binders or varnishes but form a satisfactory film when used as a mixture with a diterpene amine such as Rosin Amine D. We have found that the "Casamid" polyamines such as "Casamid 360" have marine biocidal properties. Although these polyamines are less effective marine biocides than the amines of formula (I), the mixture provides a binder or varnish in which all the components have marine biocidal properties. Such mixtures preferably comprise at least 50%, more preferably 60 to 90%, by weight of the amine of formula (I).

An alternative antifouling coating composition according to the invention comprises a pigment and as binder an acid-functional film-forming polymer whose acid groups are blocked by hydrolysable blocking groups, the composition including an ingredient having marine biocidal properties, and is characterised in that the hydrolysable blocking group is a monoamine group which forms an organic-solvent-soluble amine salt of the polymer.

The invention further provides a process for inhibiting fouling of a ship's hull, comprising applying to the hull a coating composition having marine biocidal properties and comprising as binder an acid-functional film-forming polymer whose acid groups are blocked by hydrolysable blocking groups, characterised in that the hydrolysable blocking group is a monoamine group which forms an organic-solvent-soluble amine salt of the polymer.

The acid-functional polymer is preferably a carboxylic-acid-functional polymer of equivalent weight 240 to 600. A preferred acid-functional polymer is an addition copolymer of one or more olefinically unsaturated acids or anhydrides, for example acrylic acid, methacrylic acid, maleic acid, maleic anhydride, fumaric acid, itaconic acid or itaconic anhydride, vinyl benzoic acid (for example p-vinyl benzoic acid), 3-butenoic acid or beta-carboxy-ethyl acrylate or methacrylate, with at least one olefinically unsaturated comonomer. Copolymers of methacrylic acid or acrylic acid are preferred. (The preferred equivalent weight of 240 to 600 corresponds to an acrylic acid content of 14.3 to 35.8% by weight and a methacrylic acid content of 16.7 to 41.7% by weight.) The acid monomer is preferably copolymerised with one or more comonomers which are unreactive with acid groups, for example acrylic or methacrylic esters such as methyl acrylate, methyl methacrylate, ethyl acrylate, butyl acrylate or 2-ethylhexyl methacrylate, styrene, acrylonitrile, vinyl acetate, vinyl butyrate, vinyl chloride, or vinyl pyridine. Terpolymers may be preferred, for example methyl methacrylate or ethyl methacrylate which tend to form a hard film can be used in conjunction with an acrylate such as ethyl acrylate or particularly an alkyl acrylate of 3 to 8 carbon atoms in the alkyl moiety such as butyl acrylate which helps to form a more flexible film. A substituted acrylate ester can be used as one of the comonomers, for example. Such an acid polymer preferably has a molecular weight of 1,000 to 100,000. The equivalent weight of the acid polymer (calculated as acid groups) is most preferably 300 to 440, equivalent to an acrylic acid or methacrylic acid content of about 15 to 30% by weight.

Alternative acid-functional polymers are polymers containing sulphonic acid, phosphonic acid or phosphoric acid (acid phosphate) groups. If alternative acid groups are used they are also preferably present in an addition polymer, for example an addition copolymer of an olefinically unsaturated phosphonic, phosphoric or sulphonic acid. Examples of such unsaturated acids are vinyl phosphonic acid, styrene phosphonic acid, 2-acrylamidopropane phosphonic acid, ethylidene-1, 1-diphosphonic acid, hydroxyethyl acrylate monophosphate, vinyl sulphonic acid, 2-acrylamido-2-methylpropane sulphonic acid, methallyl sulphonic acid and styrene sulphonic acid. Polymers containing stronger acid groups such as sulphonic acid groups may have a higher equivalent weight for example in the range 500 to 5000, preferably 1000 to 2000.

The monoamine which is used to form the amine salt of the acid-functional polymer preferably includes at least one organic group containing at least 8 carbon atoms, more preferably 8 to 20 carbon atoms, and is preferably an amine which is toxic to marine organisms. If such an amine is used the resulting amine salt can be a clear antifouling varnish or can be pigmented. The monoamine can for example be a diterpene-derived amine of formula (I), preferably a rosin derivative, for example Rosin Amine D. The toxic amine can alternatively be an aliphatic amine, containing an organic group of 12 to 20 carbon atoms, for example a straight-chain alkyl or alkenyl amine such as dodecyl amine, hexadecyl amine, octadecyl amine or oleyl amine or mixtures of amines derived from aliphatic groups present in natural fats and oils such as tallow amine or hydrogenated tallow amine or coconut amine. Alternative amines which can be used as the blocking group are aralkylamines such as those sold commercially as "phenalkamines".

If a non-biocidal amine is used to form the amine salt of the acid-functional polymer the coating composition should contain a marine biocide. The coating preferably contains a pigment, which may be the same as the marine biocide.

The amine salt formed from the acid-functional polymer is substantially insoluble in water and controls the rate of dissolution of the acid-functional polymer in seawater. The amine salt gradually dissociates on prolonged immersion in seawater, for example on a ship's hull in service. The amine is gradually released into the seawater. The remaining acid-functional polymer is gradually converted to free acid or anion form and becomes seawater-soluble and is gradually swept from the hull of the ship. The paints containing the amine salts of an acid-functional polymer thus act as self-polishing coatings. When a biocidal amine is used, the paints have properties very similar to known organotin copolymer paints, releasing polymer-bound biocide with the polymer binder itself gradually becoming smoothly dissolved from the ship's hull in service.

The blocked acid-functional polymer can be prepared by addition polymerisation of the corresponding blocked acid-functional monomer, i.e. an amine salt of a polymerisable ethylenically unsaturated acid such as acrylic or methacrylic acid, with one or more comonomers. Polymerisation is preferably carried out in an organic solvent such as xylene, toluene, butyl acetate, butanol, butoxyethanol or methoxypropyl acetate at a temperature of 60° to 100° C. using a free radical catalyst such as benzoyl peroxide or azobisisobutyronitrile. The amine salt is preferably formed in solution in a polar organic solvent by reaction of an acidic monomer such as acrylic or methacrylic acid with the amine to produce an amine salt and polymerised without isolating the salt, although it can be isolated if desired. The blocked acid-functional polymer can alternatively be prepared by reacting an acid-functional copolymer having free carboxyl groups with an amine as blocking agent to form an amine salt. The amine salt can be formed by simply mixing the amine and a solution of the acid-functional polymer, preferably in an organic solvent such as an aromatic hydrocarbon, a ketone, an alcohol or an ether alcohol.

The amine of formula (I) or the amine-blocked acid-functional polymer can be mixed with pigment using conventional paint blending procedures to provide a composition having a pigment volume concentration of, for example, 25 to 55%. The pigment is preferably a sparingly soluble pigment having a solubility in seawater of from 0.5 to 10 parts per million by weight, for example cuprous oxide, cuprous thiocyanate, zinc oxide, zinc ethylene bis(dithiocarbamate), zinc dimethyl dithiocarbamate, zinc diethyl dithiocarbamate or cuprous ethylene bis(dithiocarbamate). These sparingly soluble pigments which are copper and zinc compounds are generally marine biocides. These pigments produce water-soluble metal compounds on reaction with seawater so that the pigment particles do not survive at the paint surface. Mixtures of sparingly soluble pigments can be used, for example cuprous oxide, cuprous thiocyanate or zinc ethylene bis(dithiocarbamate), which are highly effective biocidal pigments, can be mixed with zinc oxide, which is less effective as a biocide but dissolves slightly more rapidly in seawater. both the amine of formula (I) and the amine-blocked acid-functional polymer can be mixed with a basic pigment such as cuprous oxide or zinc oxide without gelation of the binder, unlike acid-functional polymers containing free carboxylic acid groups. The amine salt protects the acid groups against gelation by a basic pigment.

The paint composition can additionally or alternatively contain a pigment which is not reactive with seawater and may be highly insoluble in seawater (solubility below 0.5 part per million by weight) such as titanium dioxide or ferric oxide or an organic pigment such as a phthalocyanine pigment. Such highly insoluble pigments are preferably used at less than 40% by weight of the total pigment component of the paint, most preferably less than 20%.

The antifouling paint can also contain a non-metal-liferous biocide for marine organisms, for example tetramethyl thiuram disulphide, methylene bis(thiocyanate), captan, a substituted isothiazolone or 2-methylthio-4-t-butylamino-6-cyclopropylamino-s-triazine.

The antifouling coating of the invention is generally applied from a solution in an organic solvent, for example an aromatic hydrocarbon such as xylene or toluene, an aliphatic hydrocarbon such as white spirit, an ester such as butyl acetate, ethoxyethyl acetate or methoxypropyl acetate, an alcohol such as butanol or butoxyethanol or a ketone such as methyl isobutyl ketone or methyl isoamyl ketone.

Alternatively, the antifouling composition of the invention can be an aqueous composition containing water and a water-miscible cosolvent. Examples of cosolvents which can be used are alcohols such as butanol, glycol ethers such as methoxypropanol, methoxyethanol, butoxyethanol and ethoxyethanol and esters thereof such as methoxypropyl acetate. The amines of formula (I), and also the acid-functional polymers blocked with an amine containing an organic group of at least 8 carbon atoms, are soluble in such mixtures of water and cosolvent but are substantially insoluble in water. Aqueous compositions comprising as binder a mixture of an amine of formula (I) and a water-dilutable polyamine such as "Casamid 360" need only a low level of organic cosolvent, for example less than 200 g per liter.

The invention is illustrated by the following Examples.

EXAMPLE 1

30% by volume Rosin Amine D and 20% by volume "Laroflex" (vinyl acetate/vinyl isobutyl ether copolymer) were dissolved in a solvent system comprising 37.5% by volume "Shellsol" aromatic hydrocarbon and 12.5% by volume methyl isoamyl ketone to give a clear hard antifouling varnish.

The antifouling properties of the varnish of Example 1 were tested using a leaching test. In this test a plaque coated with the film of the varnish of Example 1 was immersed in a tank of synthetic seawater and was removed for a day once a week and immersed in a smaller tank of seawater. The seawater from the smaller tank was then tested each time for toxicity against Artemia (brine shrimp) and Amphora (unicellular algae) marine organisms. The seawater samples which had been in contact with the film showed positive toxicity for each of the 8 weeks they were tested, indicating that marine biocide continued to be leached from the paint over a prolonged period.

EXAMPLE 2

30% by volume Rosin Amine D and 20% by volume "Versamid 940" polyamide resin were dissolved in a solvent system comprising 37.5% by volume xylene and 12.5% by volume butanol to give a clear hard antifouling varnish.

EXAMPLE 3

30% by volume Rosin Amine D and 20% by volume rosin were dissolved in 50% by volume "Shellsol" to form a clear antifouling varnish capable of gradually dissolving from a ship's hull on prolonged use in seawater.

The antifouling varnishes of Examples 1 to 3 were each sprayed onto plaques, forming a clear coating film in each case. The plaques were attached to a metal plate which was immersed in the sea at a site off the south coast of England rich in fouling organisms. The plaques were free of fouling after 12 months' immersion.

EXAMPLE 4

A mixture of 80% by volume Rosin Amine D and 20% by volume rosin was dissolved in xylene and milled with a mixture of 93% by volume cuprous oxide and 7% by volume zinc oxide to give a paint of solids content 47% by volume and pigment volume concentration 47% (that is 47% by volume pigment in the dried paint film).

EXAMPLE 5

Example 4 was repeated using a mixture of 80% by volume rosin and 20% by volume Rosin Amine D.

The paints of Examples 4 and 5 were sprayed onto plaques and immersed in the sea as described above. They were still free of fouling after 12 months.

The paints of Examples 4 and 5 were also tested in a rotor test of the type described in British Patent 1457590. Both paints showed a gradual decrease in film thickness due to dissolution of the binder in seawater. The paint of Example 4 decreased in thickness at a rate half that of a successful commercial self-polishing copolymer antifouling paint. The paint of Example 5 decreased in thickness at a rate identical to that of the commercial paint.

EXAMPLE 6

A mixture of 60% by volume Rosin Amine D and 40% by volume "Laroflex" was dissolved in "Shellsol" and milled with cuprous oxide to give a paint of solids content 47% by volume and pigment volume concentration 47%. The paint produced was a hard non-eroding paint suitable for use on speedboats.

EXAMPLE 7

A 40% solution of a 24/56/20 copolymer of methacrylic acid/ethyl methacrylate/methoxy ethyl acrylate was prepared by solution polymerisation using a free radical catalyst in a 1:1 by volume mixture of xylene and butanol. Rosin Amine D was added to the polymer solution in an amount of 1.03 amine groups per acid group in the polymer.

The resulting varnish was tested using the leaching test described in Example 1. The seawater samples which had been in contact with the coating of Example 7 showed substantially constant toxicity over the 8 week test period.

By comparison, when the acid copolymer solution was applied as a coating without reacting with an amine and was tested, the leached samples were seen to be non-toxic.

EXAMPLES 8 AND 9

7.5 g of the polymer amine salt solution of Example 7 was mixed with 1.5 g cuprous oxide (Example 8) and 1.5 g zinc oxide (Example 9) to form antifouling paints.

The viscosity of the paints of Examples 8 and 9 was monitored over a hundred hours after mixing by an ICI cone and plate viscometer at 25° C. The paint of Example 8 stayed at a stable viscosity of less than 10 poise over the 100 hour test. The viscosity of the paint of Example 9 was less than 40 poise at the end of the 100 hour test. By comparison, paints formed by mixing the acid-functional polymer with cuprous oxide or zinc oxide without reacting the polymer with the amine showed a rise in viscosity to over 100 poise (far too high for spray application) within 80 hours.

EXAMPLE 10

85% by volume of the polymer amine salt solution of Example 7 was milled with 14.4% by volume cuprous oxide, 0.25% by volume bentonite and 0.35% by volume silica aerogel to form an antifouling paint.

The paint was tested in a rotor disc test and showed a gradual decrease in thickness over 60 days' immersion. The polishing rate was similar to that of a commercial triorganotin copolymer antifouling paint. By comparison, when the acid copolymer was mixed with the cuprous oxide pigment without being first reacted with the amine the resulting paint was removed from the rotor disc after one day's immersion.

EXAMPLE 11

A 30/20/50 copolymer of acrylic acid/methyl methacrylate/butyl acrylate was prepared in xylene/butanol solution as described in Example 7. Rosin Amine D was added to the copolymer in an amount equivalent to the acid groups in the polymer. The resulting solution was milled with pigments, plasticiser and structuring agents to form a paint containing, by volume, 30% copolymer amine salt, 18% cuprous oxide, 1.3% zinc oxide, 4% tricresyl phosphate and 2% structuring agents.

The paint was sprayed on a plaque which was then immersed in the sea as described in Examples 1 to 3. The painted plaque showed substantially no fouling after 12 months' immersion.

The paint was tested in a rotor disc test and showed a gradual depletion in thickness at a rate substantially the same as that of a commercial self-polishing copolymer antifouling paint.

EXAMPLE 12

Rosin Amine D was dissolved in butanol and mixed with "Casamid 360" amino-functional polyamine at a volume ratio of Casamid to Rosin Amine D of 1:4. The mixed solution was diluted with water and milled with cuprous oxide to give an antifouling paint of pigment volume concentration 47% containing 196 g butanol and 247.5 g water per liter of paint.

What is claimed is:

1. An antifouling coating composition comprising a pigment and a binder containing acid groups, the composition including an ingredient having marine biocidal properties, in which said binder is a film-forming addition copolymer of an acid-functional monomer and one or more comonomers which are unreactive with acid groups, which acid groups are blocked by a hydrolysable blocking group, said hydrolysable blocking group being a monoamine group which forms an organic-solvent-soluble amine salt of the film-forming addition copolymer.

2. An antifouling coating composition according to claim 1 in which said film-forming addition copolymer is a sulphonic-acid-functional polymer of equivalent weight 500 to 5,000.

3. An antifouling coating composition according to claim 1 in which said film-forming addition polymer is a carboxylic-acid-functional polymer of equivalent weight 240 to 600.

4. An antifouling coating composition according to claim 1 in which the monoamine providing said monoamine group includes at least one organic group containing 8 to 20 carbon atoms.

5. An antifouling coating composition according to claim 4 in which the monoamine providing said monoamine group is an amine of the formula

where $R^1$ is a monovalent hydrocarbon group derived from a diterpene and $R^2$ and $R^3$ are each independently selected from the group consisting of hydrogen, an alkyl group having 1 to 18 carbon atoms or an aryl group having 6 to 12 carbon atoms.

6. An antifouling coating composition according to claim 1 in which said pigment is a copper or zinc compound which is sparingly soluble in seawater.

7. An antifouling coating composition comprising a pigment and as binder a film-forming addition polymer of molecular weight 1,000 to 100,000 containing acid groups, which acid groups are blocked by a hydrolysable blocking group, the composition including an ingredient having marine biocidal properties, said hydrolysable blocking group being a monoamine group which forms an organic-solvent-soluble amine salt of the film-forming addition polymer.

8. A process for inhibiting fouling of a ship's hull, comprising applying to the hull to form a top coat on the hull a coating composition having marine biocidal properties and comprising as binder a film-forming addition polymer of molecular weight 1,000 to 100,000 containing acid groups, which acid groups are blocked by a hydrolysable blocking group, said hydrolysable blocking group being a monoamine group which forms an organic-solvent-amine salt of the film-forming addition polymer.

* * * * *

UNITED STATES PATENT AND TRADEMARK OFFICE
CERTIFICATE OF CORRECTION

PATENT NO. : 5,116,407
DATED : May 26, 1992
INVENTOR(S) : Julian E. Hunter, et al.

It is certified that error appears in the above-identified patent and that said Letters Patent is hereby corrected as shown below:

Title page, item [30]
Foreign Application Priority Data, filing date, "Oct. 13, 1989" should read --Oct. 13, 1988--.

Signed and Sealed this

Fourteenth Day of September, 1993

Attest:

BRUCE LEHMAN

*Attesting Officer*    *Commissioner of Patents and Trademarks*